United States Patent Office 3,801,605
Patented Apr. 2, 1974

3,801,605
5-AROYL-FURANS
John Robert Carson, Norristown, Pa., assignor to McNeil Laboratories, Inc., Fort Washington, Pa.
No Drawing. Filed Jan. 21, 1972, Ser. No. 219,860
Int. Cl. C07c 5/16
U.S. Cl. 260—347.3     10 Claims

ABSTRACT OF THE DISCLOSURE

Compounds of the class of 5-aroyl-furan-2-acetic acids and esters useful as anti-inflammatory agents and the corresponding nitrile and amide precursors thereof.

BACKGROUND OF THE INVENTION

The invention pertains to the field of 5-aroyl-furan-2-acetic acids and esters which demonstrate anti-inflammatory activity. The subject furans differ from the prior art (see Belgian Pat. No. 762,060) by having a furan ring nucleus instead of a pyrrole ring nucleus.

DESCRIPTION OF THE PREFERRED EMBODIMENTS

The novel 5-aroyl-furans of this invention having anti-inflammatory activity may be structurally represented by the formula:

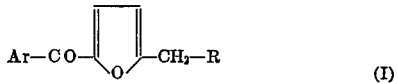

(I)

wherein R is a member selected from the group consisting of COOH and COO(loweralkyl); and Ar is a member selected from the group consisting of phenyl and phenyl substituted with one or more of the following groups: loweralkyl, loweralkoxy, halo and methylthio, preferably mono-substituted. Among the preferred acids and esters of Formula I are those having a halobenzoyl substituent in the 5-position.

As used herein, "loweralkyl" and "loweralkoxy" may be straight or branch chained and have from 1 to about 5 carbon atoms, such as, for example, methyl, ethyl, propyl, isopropyl, butyl, pentyl and the like alkyls, and methoxy, ethoxy, propoxy, isopropoxy, butoxy, pentoxy and the like alkoxys. The term "halo" is generic to chloro, bromo, fluoro and iodo, although chloro is preferred.

The compounds of Formula I, wherein R is COOH, may be prepared by:

(i) a Friedel-Crafts reaction between an appropriate aroyl halide (II), preferably the chloride, and furan-2-acetonitrile (III) in the presence of a Lewis acid, preferably a metallic halide such as aluminum chloride, stannic chloride and the like, in a suitable solvent such as is typically employed in a Friedel-Crafts type of reaction, for example, methylene chloride, 1,2-dichloroethane, carbon disulfide, nitrobenzene and the like, followed by (ii) conversion of the 5-aroyl-furan-2-acetonitrile (IV) thus-obtained to the corresponding free carboxylic acid form by conventional nitrile-to-acid hydrolysis, for example, by refluxing the nitrile with aqueous sulfuric acid (20–70%), with concentrated (about 40%) hydrobromic or hydrochloric acid, or with concentrated (about 85%) phosphoric acid, or by conversion of the nitrile (IV) first to the amide form (V) by conventional partial hydrolysis (i.e., nitrile-to-amide) procedures, for example, by heating in polyphosphoric acid, or by treatment with concentrated sulfuric acid, followed by standard aqueous workup, and then transforming the thus-obtained 5-aroyl-furan-2-acetamide to the acid form by standard hydrolysis procedures.

The acids of Formula I are readily converted into the corresponding loweralkyl esters by conventional esterification, for example, with an appropriate lower alkanol in the presence of an acid catalyst.

The foregoing reactions may be illustrated by the following schematic diagram:

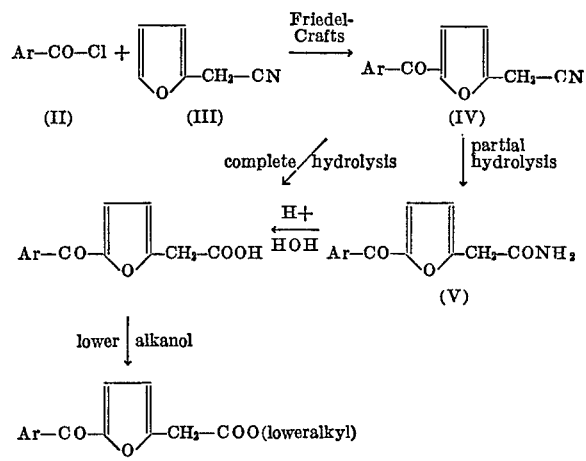

The nitriles and amides of Formula IV and Formula V, respectively, are also deemed to be novel and, in view of their utility as precursors for preparing the compounds of Formula I, they constitute an additional feature of this invention. Said nitriles and amides may be generically described by the following structural formula:

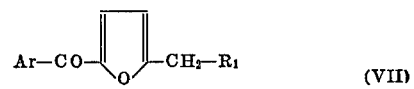

(VII)

wherein $R_1$ is a member selected from the group consisting of CN and $CONH_2$; and Ar is as previously defined, preferably halophenyl.

The acids and esters of Formula I possess anti-inflammatory activity as demonstrated in the standard kaolin-induced rat paw edema assay (described in Belgian Pat. No. 762,060) at doses ranging from about 5 to about 250 mg./kg. body weight. For example, with 5-(p-chlorobenzoyl)-furan-2-acetic acid, the most preferred species, an inhibition of 20% is observed in this assay at a dosage of 25 mg./kg. body weight and an inhibition of 29% at a dosage of 50 mg./kg. body weight.

The following examples are intended to illustrate, but not to limit, the scope of the present invention.

Example I 5-(p-chlorobenzoyl)-furan-2-acetonitrile: A solution of 5.35 g. (0.05 mole) furan-2-acetonitrile in 25 ml. of 1,2-dichloroethane is added to 7.1 g. (0.05 mole) of aluminum chloride and 6.8 ml. (0.05 mole) or p-chlorobenzoyl chloride in 25 ml. of 1,2 - dichloroethane at reflux temperature. The addition is complete in 5 min. and hydrogen chloride is vigorously evolved. The mixture is poured into a mixture of ice-dilute hydrochloric acid. The aqueous layer is separated and washed with chloroform. The combined organic solutions are washed successively with water, dimethylaminopropylamine solution, dilute hydrochloric acid and brine. The organics are then dried over magnesium sulfate and evaporated in vacuo. The residue is recrystallized from 2-propanol to give a brown crystalline solid, 5-(p-chlorobenzoyl)-furan-2-acetonitrile, M.P. 116–118° C.

Example II

The Friedel-Crafts acylation procedure of Example I is followed to prepare the nitriles of Formula IV. For example, by repeating Example I except that an equivalent amount of an appropriate benzoyl chloride acylating agent is substituted for the p-chlorobenzoyl chloride used therein, the following nitriles are obtained as respective products:

5-(p-methylbenzoyl)-furan-2-acetonitrile;
5-(p-ethoxybenzoyl)-furan-2-acetonitrile;
5-benzoyl-furan-2-acetonitrile;
5-(p-methylthiobenzoyl)-furan-2-acetonitrile; and
5-(o-methylbenzoyl)-furan-2-acetonitrile.

Example III 5-(p-chlorobenzoyl)-furan-2-acetic acid: A mixture of 7.0 g. (0.0285 mole) of 5-(p-chlorobenzoyl)-furan-2-acetonitrile, 20 ml. of water and 100 ml. of 85% phosphoric acid is heated on a steam bath for 4 hours. The mixture is then cooled, poured into water and extracted with ether. The ether extracts are in turn extracted with sodium bicarbonate solution. The bicarbonate solution extracts are acidified with dilute hydrochloric acid and the precipitated solid collected by filtration. There is obtained about 3.0 g. of a brown solid, 5-(p-chlorobenzoyl)-furan-2-acetic acid, M.P. 145–6° C. which is recrystallized from 2-propanol, M.P. 145–6° C.

Example IV

The nitrile-to-acid transformation procedure of Example III is followed to prepare the acids of Formula I. For example, by repeating Example II except that an equivalent amount of each nitrile obtained in Example II is substituted for the 5-(p-chlorobenzoyl)-furan-2-acetonitrile used therein, the following acids are obtained as respective products:

5-(p-methylbenzoyl)-furan-2-acetic acid;
5-(p-ethoxybenzoyl)-furan-2-acetic acid;
5-benzoyl-furan-2-acetic acid;
5-(p-methylthiobenzoyl)-furan-2-acetic acid; and
5-(o-methylbenzoyl)-furan-2-acetic acid.

Example V

Ethyl 5-(p-chlorobenzoyl)-furan-2-acetate: 5.0 grams of 5-(p-chlorobenzoyl)-furan-2-acetic acid in 100 ml. of absolute ethanol containing 0.5 g. of hydrogen chloride is heated under reflux for one hour. The solvent is evaporated in vacuo to yield the ester product: ethyl 5-(p-chlorobenzoyl)-furan-2-acetate.

Example VI

Propyl 5-(p-chlorobenzoyl)-furan-2-acetate: By repeating the procedure of Example V except that 100 ml. of n-propanol is used in place of ethanol as the esterifying agent, there is obtained the corresponding propyl ester product.

Example VII

The esterification procedures of Examples V and VI are followed to esterify an equivalent quantity of each of the acid products obtained in Example IV. For example, the following ester products are obtained:

ethyl 5-(p-methylbenzoyl)-furan-2-acetate;
propyl 5-(p-ethoxybenzoyl)-furan-2-acetate;
ethyl 5-benzoyl-furan-2-acetate;
propyl 5-(p-methylthiobenzoyl)-furan-2-acetate; and
ethyl 5-(o-methylbenzoyl)-furan-2-acetate.

Example VIII 5-(p-chlorobenzoyl) - furan - 2 - acetamide: A 5.8 g. sample of 5-(p-chlorobenzoyl)-furan - 2 - acetonitrile is added to 92 g. of polyphosphoric acid. The mixture is heated and stirred on a steam bath for 30 min., then cooled and poured into water. The precipitated solid is collected by filtration and recrystallized from acetone to give about 4.9 g. of 5-(p-chlorobenzoyl)-furan-2-acetamide, M.P. 180–1° C.

Example IX

The nitrile-to-amide hydrolysis procedure of Example VIII may be followed to prepare the 5-aroyl-furan-2-acetamide precursors of Formula V. For example, by substituting an equivalent amount of each acetonitrile obtained in Example II for the 5-(p-chlorobenzoyl)-furan-2-acetonitrile used therein, the corresponding 5-aroyl-furan-2-acetamides are respectively obtained.

Example X 5-(p-chlorobenzoyl)-furan-2-acetic acid: A suspension of 4.9 g. of 5-(p-chlorobenzoyl)-furan-2-acetamide in 59 ml. of 85% phosphoric acid and 10 ml. of water is heated on a steam bath for six hours. The mixture is cooled, diluted with water and extracted with ether. The ether extract is in turn extracted with sodium bicarbonate solution. The latter is then acidified with dilute HCl and the precipitated product, 5-(p-chlorobenzoyl)-furan-2-acetic acid, is collected by filtration and dried.

Example XI

The amide-to-acid hydrolysis procedure of Example X may be followed to prepare the 5-aroyl-furan-2-acetic acids of Formula I. For example, by substituting an equivalent amount of each acetamide obtained in Example IX for the 5-(p-chlorobenzoyl)-furan-2-acetamide used therein, the corresponding 5-aroyl-furan-2-acetic acids are respectively obtained.

I claim:
1. A 5-aroyl-furan of the formula:

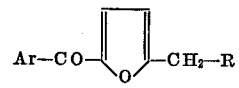

wherein R is a member selected from the group consisting of COOH and COO(loweralkyl); and Ar is a member selected from the group consisting of phenyl, loweralkylphenyl, loweralkoxyphenyl, halophenyl and methylthiophenyl.
2. 5-halobenzoyl-furan-2-acetic acid.
3. 5-(p-chlorobenzoyl)-furan-2-acetic acid.
4. Loweralkyl 5-halobenzoyl-furan-2-acetate.
5. Ethyl 5-(p-chlorobenzoyl)-furan-2-acetate.
6. A 5-aroyl-furan of the formula:

wherein $R_1$ is a member selected from the group consisting of CN and $CONH_2$; and Ar is a member selected from the group consisting of phenyl, loweralkylphenyl, loweralkoxyphenyl, halophenyl and methylthiophenyl.
7. 5-halobenzoyl-furan-2-acetonitrile.
8. 5-(p-chlorobenzoyl)-furan-2-acetonitrile.
9. 5-halobenzoyl-furan-2-acetamide.
10. 5-(p-chlorobenzoyl)-furan-2-acetamide.

References Cited
UNITED STATES PATENTS 3,560,525  2/1971  Kaltenbronn _____ 260—347.3
3,644,399  2/1972  Brown et al. _____ 260—347.3

HENRY R. JILES, Primary Examiner

B. DENTZ, Assistant Examiner

U.S. Cl. X.R.

260—347.5, 347.8; 424—285

PO-1050
(5/69)

UNITED STATES PATENT OFFICE
CERTIFICATE OF CORRECTION

Patent No. 3,801,605      Dated April 2, 1974

Inventor(s) John Robert Carson

It is certified that error appears in the above-identified patent and that said Letters Patent are hereby corrected as shown below:

In Column 3, line 33, "Example 11" should read --- Example 111 ---.

In Column 3, line 68, "♂" should read --- 0 ---.

Signed and sealed this 11th day of March 1975.

(SEAL)
Attest:

RUTH C. MASON
Attesting Officer

C. MARSHALL DANN
Commissioner of Patents
and Trademarks